United States Patent [19]

Coleman

[11] 4,287,516
[45] Sep. 1, 1981

[54] MINIMAL ENERGY DISSIPATING DETECTOR

[75] Inventor: Charles Coleman, Lakewood, Colo.

[73] Assignee: Emerson Electric Co., St. Louis, Mo.

[21] Appl. No.: 68,936

[22] Filed: Aug. 23, 1979

[51] Int. Cl.³ .............................................. G08B 17/10
[52] U.S. Cl. .................................. 340/629; 250/381
[58] Field of Search ................ 340/628, 629; 250/381, 250/382, 384, 385; 363/60, 61

[56] References Cited

U.S. PATENT DOCUMENTS 4,096,473  6/1978  Sweany et al. .................. 340/629 X

FOREIGN PATENT DOCUMENTS 2836233  2/1979  Fed. Rep. of Germany ........... 340/629

*Primary Examiner*—John W. Caldwell, Sr.
*Assistant Examiner*—Daniel Myer
*Attorney, Agent, or Firm*—Sheridan, Ross, Fields & McIntosh

[57] ABSTRACT

A combustion products detection apparatus and method are provided. The apparatus is powered by an energy source which provides a relatively low DC output voltage. This DC voltage is multiplied by a voltage multiplier circuit in conjunction with a first oscillator having an output of a first predetermined frequency. The output voltage of the voltage multiplier circuit is applied to a combustion products sensor circuit. Upon detection of a predetermined concentration of combustion products in the region being monitored by the sensor circuit, a second oscillator is enabled. The second oscillator has an output of a second predetermined frequency which is a greater frequency than the first predetermined frequency. The second predetermined frequency output controls the voltage multiplier circuit when the predetermined concentration of combustion products is present. A greater amount of current is thereby delivered to the load of the apparatus when the predetermined concentration of combustion products is present thereby assuring proper indication of the presence of the combustion products.

8 Claims, 1 Drawing Figure

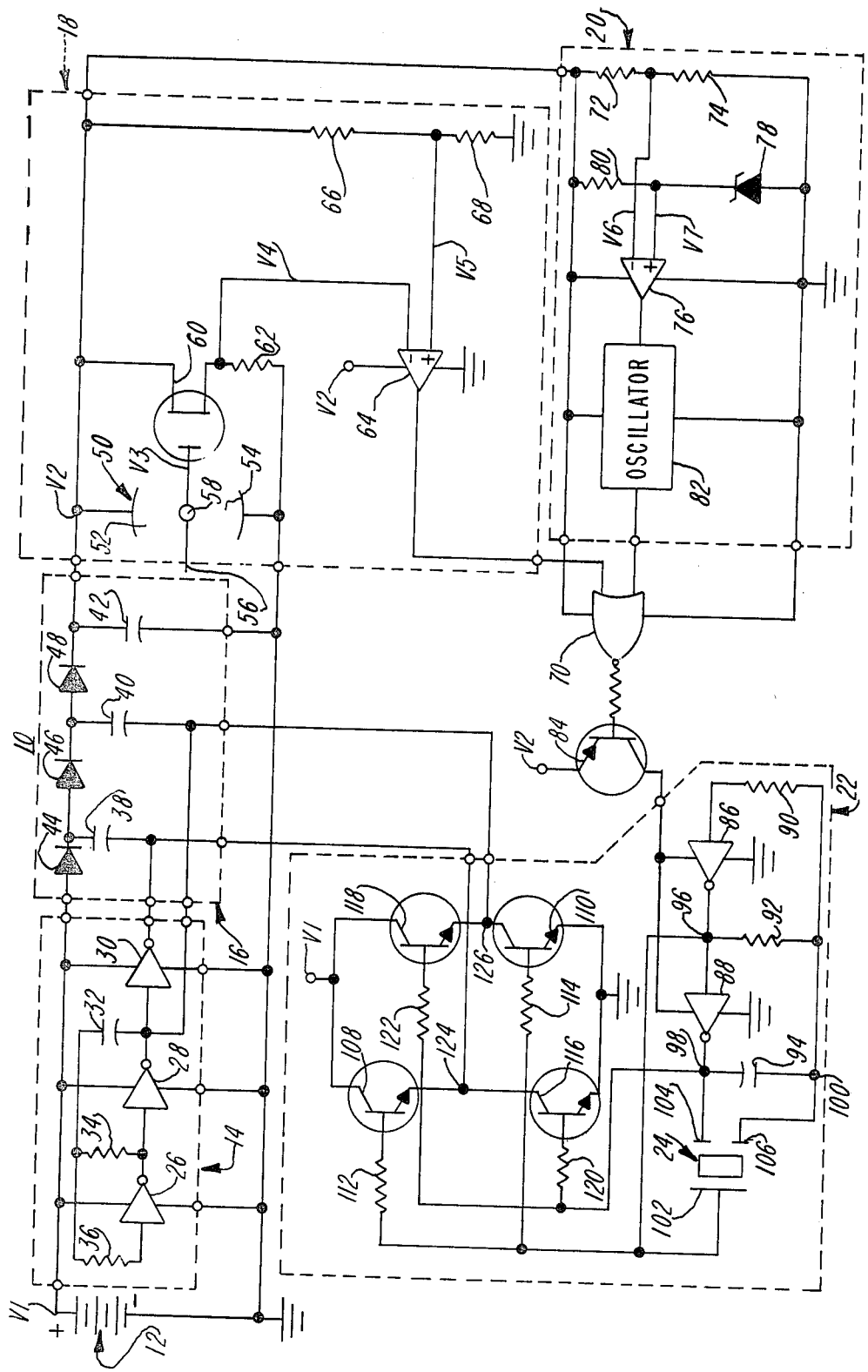

MINIMAL ENERGY DISSIPATING DETECTOR

TECHNICAL FIELD

The present invention relates to a condition detecting apparatus and method and, in particular, to a combustion products detection apparatus that minimizes the amount of energy required for proper operation.

BACKGROUND ART

Combustion product detecting devices, presently available, are powered directly by an AC or DC energy source or by an AC source whose energy is converted to a DC output for use by the device. In the case of DC powered detectors, a battery normally provides the DC energy. The battery output voltage which is required for proper operation of the detector is relatively high, generally in the range of 9 VDC. Typically, the cost of a DC battery is directly proportional to the output battery voltage desired, that is to say, as the battery output voltage decreases the cost of the battery decreases also. Consequently, cost savings can be achieved by powering a combustion products detector or other battery powered device with a battery having a relatively low voltage output.

However, in attempting to reduce the battery output voltage, difficulties arise since sufficient voltage and current must be provided to assure proper operation of the detector. Furthermore, in an alarm state when the detector senses combustion products present in the region being monitored, sufficient current must be available for the load, including a perceptible indicator, so that the presence of combustion products is satisfactorily made known. On the other hand, the current to the load, in a normal state when the combustion products are not present, should be sufficiently low to minimize the current drain on the energy source. Accordingly, a combustion products detection apparatus is provided as described herein which reduces the amount of energy required for proper operation.

SUMMARY OF THE INVENTION

In accordance with this invention, an energy source is provided to power a first oscillator which generates an output at a first predetermined frequency. The first oscillator controls a voltage multiplier circuit, the output voltage of which is applied across an ion chamber. The ion chamber monitors the presence of combustion products in the atmosphere. When a predetermined concentration of combustion products is detected, a second oscillator is enabled. The second oscillator generates an output at a second predetermined frequency. The second predetermined frequency is greater than the first predetermined frequency and controls the voltage multiplier circuit so that increased current is available to assure proper operation of a perceptible indicator. The perceptible indicator provides a signal that the predetermined concentration of combustion products has been detected in the atmosphere.

More particularly, a relatively low DC output voltage is provided to energize a combustion products detection apparatus having a load to which electrical power is delivered. The DC supply energizes a first oscillator which produces an output at a first predetermined frequency. The first oscillator is connected to a voltage multiplier circuit which outputs a voltage of approximately three times that of the DC supply voltage. This trebled voltage is applied across an ion chamber to assure proper operation of the condition detecting circuitry of the apparatus. A comparator is responsive to voltage changes in the ion chamber resulting from combustion products present in the region being monitored by the apparatus while a DC energy monitoring circuit is responsive to changes in the trebled voltage. The outputs of the comparator and DC energy monitoring circuits are applied to a second oscillator. The second oscillator produces a second predetermined frequency when either a predetermined concentration of combustion products is detected or the trebled voltage decreases below a predetermined value. The second oscillator is also connected to the voltage multiplier circuit. Inasmuch as the second oscillator generates a greater frequency output than the first oscillator, the second oscillator controls the voltage multiplier circuit. When the second oscillator is enabled, increased current is delivered to the load of the apparatus and a perceptible indicator is properly enabled.

Based on the foregoing description, the present invention affords a number of worthwhile advantages. A combustion products detection apparatus is provided which is powered by a relatively low DC supply voltage. The DC supply voltage is trebled by a voltage multiplier circuit to assure a proper operating voltage for the condition detecting circuitry of the apparatus. During a first or normal or standby state when the region being monitored is relatively clear of combustion products, the first oscillator, having a first predetermined frequency output, controls the voltage multiplier circuit so that a relatively small amount of current is delivered to the apparatus load inasmuch as the current requirements thereto are minimal. Conversely, during a second or alarm state when a predetermined concentration of combustion products is detected in the region being monitored, the second oscillator, having a second predetermined frequency output, controls the voltage multiplier circuit so that a relatively large amount of current is supplied to the detector load to assure proper operation of the perceptible indicator. Accordingly, overall current drain of the DC supply is minimized since increased current is generated only when the detector load so requires additional current, that is, when an alarm state is present. Additional advantages of this invention will be readily apparent from the following description taken in conjunction with the accompanying drawing.

BRIEF DESCRIPTION OF THE DRAWING

The single FIGURE is a circuit diagram of a typical combustion products detection apparatus illustrating the present invention.

DESCRIPTION OF THE EMBODIMENTS

The combustion products detection apparatus 10 of the present invention is illustrated in the FIGURE and comprises a battery 12, first oscillator circuit 14, a voltage multiplier circuit 16, a combustion products sensor circuit 18, an energy level monitor circuit 20, and a second oscillator circuit 22 together with an alarm horn 24. The battery 12 has an output voltage V1. Typically, V1 is 4.5 volts with the negative terminal of the battery 12 grounded. However, it is understood that a different low DC voltage output could be provided to power the detection apparatus 10.

The first oscillator circuit 14 includes three conventional logic signal inverters 26, 28, 30. Each of the inverters 26, 28, 30 is powered by the battery 12. The output of inverter 26 is connected to the input of inverter 28 while the output of inverter 28 is connected to the input of inverter 30. An RC circuit is connected between the input and output of inverter 28. Specifically, a first end or negative terminal of capacitor 32 is connected to the output of inverter 28 while resistor 34 is connected between the second end or positive terminal of capacitor 32 and the input to inverter 28. Resistor 36 is connected between resistor 34 and the input to inverter 26 to protect inverter 26 by limiting the current thereto.

The voltage multiplier circuit 16 includes three capacitors, 38, 40, 42 and three diodes 44, 46, 48. The anode of diode 44 is connected to voltage V1 of battery 12 while the cathode of diode 44 is connected to both the second end or positive terminal of capacitor 38 and the anode of diode 46. The first end or negative terminal of capacitor 38 is tied to the output of inverter 30 while the first end or negative terminal of capacitor 40 is tied to the output of inverter 28. The cathode of diode 46 is connected to the second end or positive terminal of capacitor 40 and the anode of diode 48. The cathode of diode 48 is joined to the second end or positive terminal of capacitor 42 while the first end or negative terminal thereof is joined to the negative terminal of battery 12. The voltage multiplier circuit 16 together with the first oscillator 14 act to multiply the battery voltage V1 by a factor of three so that, ideally, the voltage V2 across capacitor 38 is three times the voltage V1 of battery 12. Actually, the voltage V2 is lower than three times the voltage V1 because of the forward voltage drops across diodes 44, 46, 48. Since these small voltage drops are not significant to the operation of the apparatus, 10, it can be assumed that the voltage V2 is approximately three times the voltage V1.

The voltage V2 is applied to the combustion products sensor circuit 18 so that a voltage V2 is directly across ion chamber 50. In the present embodiment, ion chamber 50 is a double ion chamber which is provided for sensing the presence of combustion products in the atmosphere or region being monitored. Double ion chamber 50 includes an active chamber 52 and a reference chamber 54 with a common electrode 56 placed therebetween. A radioactive source 58, positioned within a passage through common electrode 56, is provided for ionizing air molecules within both of the chambers 52, 54. A sensed signal or voltage V3 of common electrode 56 is at a nominal potential when there are relatively no products of combustion, such as smoke, entering the relatively open active chamber 52. When combustion products are present in the region being monitored by ion chamber 50, V3 changes proportionately in magnitude according to the concentration of combustion products in the active chamber 52. Since the impedance of the active chamber 52 increases with greater concentrations of smoke particles V3 correspondingly decreases. The voltage V3 at the common electrode 56 is, then, inversely proportional to the percentage or concentration of combustion products in the atmosphere. The common electrode 56 of the ion chamber 50 is connected to FET (field effect transistor) 60 which is provided as a voltage follower of the ion chamber voltage V3, that is to say, as the voltage V3 decreases the current through resistor 62 decreases and, accordingly, the voltage V4 thereacross also decreases.

The combustion products sensor circuit 18 further includes a conventional comparing circuit comprising an operational amplifier 64 which is connected as a comparator. The voltage V4 is connected to the inverting terminal of comparator 64 while the voltage V5, provided by the voltage divider circuit comprising resistors 66, 68, is connected to the non-inverting terminal of comparator 64. The output of comparator 64 is inputted to a first input of a standard NOR gate 70. The output of the energy monitoring circuit 20 is inputted to a second input of NOR gate 70. The energy level monitoring circuit 20 includes a voltage divider circuit comprising a pair of resistors 72, 74 joined in series to provide a reference voltage V6 to the inverting terminal of operational amplifier 76 which is connected as a comparator. The non-inverting terminal of comparator 78 is connected between the cathode of zener diode 78 and current limiting resistor 80. The zener diode 78 provides a stable reference voltage input to the non-inverting terminal of comparator 76. The zener diode 78 and the voltage divider circuit are powered by the trebled voltage V2. The output of comparator 76 is applied to a clock oscillator 82 which provides the input to the NOR gate 70.

The output of NOR gate 70 is connected to the second oscillator circuit 22. Transistor 84 responds to the output of the NOR gate 70. The collector of transistor 84 is joined to inverters 86, 88 for applying power thereto. The input of inverter 86 is connected to a first end of resistor 90 which limits the current to inverter 86. The output of the inverter 86 is applied to the input of inverter 88. An RC circuit is joined between the input and output of inverter 88. Specifically, resistor 92 is connected to the input of inverter 88 while capacitor 94 is connected to the output of inverter 88 and resistor 92. The alarm horn 24 is connected to the input of inverter 88 at circuit point 96 and the output of inverter 88 at circuit point 98. A third circuit point 100 between capacitor 94 and resistor 92 is also connected to the alarm horn 24. In the present embodiment, the alarm horn 24 includes a piezoelectric crystal having three electrodes. Electrode 102 is connected to the output of inverter 86. Electrode 104 is connected to the output of inverter 88 and the first end of capacitor 94. Electrode 106 is connected to the second end of capacitor 94 and provides a feedback signal to the input of the crystal of alarm horn 24. The circuit point 96 is connected to the base of transistors 108, 110 through resistors 112, 114 respectively while the circuit point 98 is connected to the base of transistors 116, 118 through resistors 120, 122 respectively. Circuit point 124 is at the voltage potential of the collector of transistor 116 and is tied to the first end of capacitor 38. Circuit point 126 is at the voltage potential of the collector of transistor 110 and is tied to the first end of capacitor 40.

During operation of the apparatus 10, the voltage V1 of battery 12 is applied to the inverters 26, 28, 30. The first oscillator circuit 14 and voltage multiplier circuit 16 function together to provide the voltage V2. The operation of the first oscillator 14 and voltage multiplier 16 can be explained by assuming that capacitors 32, 38, 40, 42 are initially in the discharged state and each of the capacitors has no voltage applied across the terminals thereof. Consequently, a logic LOW is inputted to inverter 26, a logic HIGH is inputted to inverter 28, and a logic LOW is inputted to inverter 30. The logic HIGH at the output of inverter 26 results in capacitor 32 being charged through resistor 34. Concurrently, capacitors 40, 42 are charged to the battery output voltage V1 through diodes 44, 46, 48, assuming no forward voltage drop across the diodes. Depending upon the values selected for resistor 34 and capacitor 32, which values determine the RC time constant, the voltage of capacitor 32 becomes a logic HIGH in a predetermined time period. This logic HIGH is applied through resistor 36 to inverter 26. The output of inverter 26 switches from a logic HIGH to a logic LOW while the output of inverter 28 switches to a logic HIGH. A logic HIGH at the first end or negative terminal of capacitor 32 results in the exponential decay of the voltage across capacitor 32. The logic LOW at the first end or negative terminal of capacitor 38 permits the capacitor 38 to be charged to approximately the battery output voltage V1. Capacitor 32 eventually discharges to a voltage level which is a logic LOW. This logic LOW is gated to inverter 26 which outputs a logic HIGH. The outputs of inverters 28, 30 become a logic LOW and a logic HIGH, respectively. The logic HIGH at the first end of capacitor 38 results in the charging of capacitors 40, 42 to approximately twice the battery voltage V1. After capacitor 32 charges to a logic HIGH voltage level again, the outputs of inverters 28, 30 switch to a logic LOW and a logic HIGH, respectively. Consequently, capacitor 42 charges to a voltage approximately three times the battery output voltage V1. The voltage V2 is then approximately three times the battery output voltage V1. It can be readily understood that capacitor 42 continuously supplies its charge to the load of the apparatus 10 even when diode 48 is reverse biased and capacitor 42 is not being charged. It is also easily appreciated that for proper operation of the voltage multiplier circuit 16 it is necessary that the RC charging and discharging time of the first oscillator 14 be sufficiently long to permit capacitors 38, 40, 42 to be charged to multiplies of the battery output voltage V1.

The voltage V2 is applied across the dual ion chamber 50. As previously described, the common electrode 56 of the ion chamber 50 outputs a voltage inversely proportional to the concentration of combustion products present in the region being monitored. When the region is in a first or normal state in which a concentration of combustion products is not present in the atmosphere being monitored, the voltage V3 of common electrode 56 is sufficiently large to maintain FET 62 turned on so that current flows through resistor 62 and a voltage V4 is developed thereacross. The voltage V4 communicates with the inverting terminal of comparator 64 and is sufficiently greater than the reference voltage V5 applied to the non-inverting terminal that a logic LOW is outputted by comparator 64. It being understood that voltage V5 can be chosen to provide the desired detector sensitivity, ie., as the voltage V5 approaches the voltage V4 in magnitude the apparatus 10 is made more sensitive to the presence of combustion products.

The operation of the energy level monitoring circuit 20 is similar to the operation of combustion products sensor circuit 18. The voltage V6 of the voltage divider circuit is applied to the inverting terminal of comparator 76. The voltage V7 across zener diode 78 is applied to the non-inverting terminal of the comparator 76. The voltage V6 reflects changes in the voltage V2 and, consequently, monitors any decrease in the battery output voltage V1 while the voltage V7 remains essentially constant because of the voltage regulating zener diode 78. The voltage V7 is selected to be of a value less than V6 when V2 is approximately three times the battery output voltage V1. The output of comparator 76 is, therefore, a logic LOW when the voltage V1 is greater than a predetermined value. The logic LOW is inputted to oscillator 82. Oscillator 82 is a reference oscillator or clock which provides output pulses at a preselected frequency when enabled by a logic HIGH. Since oscillator 82 is not enabled by the logic LOW of comparator 76, a logic LOW is outputted therefrom to NOR gate 70. NOR gate 70 also receives the output of comparator 64. When both of these signals are a logic LOW, the output of the NOR gate 70 is a logic HIGH. A logic HIGH maintains pnp transistor 84 in a non-conducting or off state. When transistor 84 is off, second oscillator circuit 22 is not enabled since no voltage is applied to inverters 86, 88. Furthermore, when second oscillator 22 is not enabled, the voltage at the first ends of capacitors 38, 40 is controlled by first oscillator 14. First oscillator 14 also thereby controls the voltages at the collectors of transistors 110, 116.

Upon detection of a predetermined concentration of combustion products, voltage V3 at common electrode 56 of ion chamber 50 decreases such that FET 60 is rendered sufficiently less conductive so that V4 becomes less in magnitude than V5. The output of comparator 64 thereby becomes a logic HIGH. This logic HIGH is applied to NOR gate 70 which outputs a logic LOW. A logic LOW biases transistor 84 on so that inverters 86, 88 are activated. Assuming capacitor 94 is in a discharged state initially, a logic LOW is present on the input of inverter 86 while logic HIGH is inputted to inverter 88 and a logic LOW is outputted therefrom. The RC network of capacitor 94 and resistor 92 enables the inverters 86, 88 to change state in a manner similar to that described with respect to the first oscillator 14. The changing or alternating signal provided by the inverters 86, 88 is applied to the electrodes 102, 104 of the piezoelectric crystal 24. This alternating signal drives or energizes the crystal 24 which vibrates at its natural or resonant frequency thereby producing a perceptible sound indicating that the predetermined concentration of combustion products is present. Upon being energized, the crystal 24 forces the RC network to the resonant frequency of the crystal 24 by means of the feedback signal outputted from the crystal electrode 106. This feedback signal at the resonant frequency of the crystal 24 maximizes the amplitude of the signal applied to the crystal 24 through inverters 86, 88 so that sufficient electrical energy is supplied to the crystal 24 for adequate operation thereof. In energizing the alarm horn, however, additional current must be provided by the battery 12 to assure that the alarm horn 24 continues to sound while the predetermined concentration of combustion products is being detected. The supplying of increased current is provided by the frequency of oscillation generated by the crystal 24 after being energized. The electrodes 102, 104 of the crystal 24 are connected at the outputs of inverters 86, 88 respectively. The output of inverter 86 is connected to the base of transistors 108, 110 while the output of inverter 88 is connected to the base of transistors 116, 118. Consequently, when the output of inverter 86 is a logic HIGH, as determined by the frequency of oscillation of the crystal 24, transistors 108, 110 are turned on or saturated so that a logic LOW is present across the collector-emitter junction of transistors 108, 110. Conversely, the logic LOW of inverter 88 as determined by the frequency of oscillation of the crystal 24, maintains transistors 116, 118 in a cut-off state so that a logic HIGH is present across the collector-emitter junction of transistors 116, 118. Since the voltage at circuit point 124 is tied to the first end of capacitor 38 while the voltage at circuit point 126 is tied to the first end of capacitor 40, the frequency of the second oscillator 22 controls the charging of capacitors 38, 40, 42 in a manner similar to that described with respect to the first oscillator 14. However, the resonant frequency of the crystal is selected such that the frequency output of the second oscillator 22 is substantially greater than the first oscillator 14. The second oscillator 22, upon being enabled, overrides or neutralizes the operation of first oscillator 14 so that second oscillator 22 provides the input to voltage multiplier circuit 16 rather than the first oscillator 14.

Typically, first oscillator 14 provides a frequency output of approximately 100 HZ while second oscillator 22 provides a frequency output of approximately 3 KHZ. It is axiomatic that the charge on a capacitor is directly proportional to the value of the capacitance of the capacitor and the voltage across the capacitor. The current through a capacitor is a function of the change of charge on the capacitor. Therefore, increasing the frequency of the applied voltage across the capacitor increases the current therethrough. The predetermined frequency output of the second oscillator 22 is chosen to be greater than the frequency output of the first oscillator 14 so that sufficient energy is provided to the load of the apparatus 10, including alarm horn 24 which requires a relatively substantial amount of power to properly operate, when a predetermined concentration of combustion products is present. Conversely, when the predetermined concentration of combustion products is not present, second oscillator 22 is disabled and first oscillator 14 controls the supplying of energy to the load of the apparatus 10 and a relatively small amount of power is required for proper operation since the alarm horn 24 is not energized. Typically, when first oscillator 14 controls the supplying of current to the load, the amount of current drain from battery 12 is approximately 20 microamperes. When second oscillator 22 is enabled and controls the supplying of current to the load of the apparatus 10, the amount of current drain from battery 12 is approximately 100 milliamperes. It is readily appreciated, based on these typical current requirements, that minimal current is dissipated when the apparatus 10 detects a normal state and the predetermined concentration of combustion products is not present. When the predetermined concentration of combustion products is present, the current drain of the battery 12 to the load is significantly increased so that the alarm horn 24 is adequately energized.

The operation of the apparatus 10 when the battery voltage V1 decreases below a predetermined value is similar to the detector operation just described. When voltage V6 drops below a predetermined value comparator 76 outputs a logic HIGH, indicating that V2 is below a predetermined value, and oscillator 82 is enabled. A pulse train is outputted therefrom to NOR gate 70. NOR gate 70 intermittently outputs a logic LOW which intermittently energizes second oscillator 22 thereby causing alarm horn 24 to intermittently sound. Second oscillator 22, when enabled, controls the supplying of sufficient current to drive the alarm horn 24 during the time the energy level or battery voltage V1 is below the predetermined value.

In addition to the detection of combustion products as provided herein for illustrative purposes, the invention described may be utilized in a variety of applications. For example, a detecting apparatus, including the features of this invention, could be used for detecting the presence of an intruder. Since it is desirable to minimize the energy dissipation of the detector during normal operation when no intruder has been detected and yet have sufficient energy available to enable a relatively high energy consuming perceptible indicator when an intruder is present, the invention described herein can be used.

From the foregoing description, a number of worthwhile advantages of the present invention are readily discernable. A detection apparatus is provided which requires a relatively low supply voltage. When a predetermined concentration of combustion products is not detected, the apparatus dissipates a minimal amount of current for proper operation thereof. When a predetermined concentration of combustion products is detected, increased current is delivered to the load of the apparatus so that a perceptible indicator or alarm is adequately powered.

The invention has been described in detail with reference to a particular embodiment, but it will be understood that variations and modifications can be affected within the spirit and scope of this invention.

I claim:

1. A combustion products detection apparatus having a load which minimizes the amount of energy required for proper operation by controlling the magnitude of power delivered to the load of the apparatus, said apparatus comprising:
   a source of power;
   means for detecting the presence of a predetermined concentration of combustion products;
   first power supplying means connected to said power source and said detecting means for delivering power to the load of the apparatus when the predetermined concentration of combustion products is not present, said first power supplying means including oscillator means for outputting a signal having a first predetermined frequency; and
   second power supplying means responsive to said detecting means when the predetermined concentration of combustion products is present, said second power supplying means increasing the power supplied to the load of the apparatus when the predetermined concentration of combustion products is present, said second power supplying means outputting a signal having a second predetermined frequency.

2. The apparatus, as claimed in claim 1, wherein:
   said first power supplying means includes voltage multiplier means which increases the voltage applied to said detecting means so that the voltage applied to said detecting means is substantially greater than the voltage output of said power source.

3. The apparatus, as claimed in claim 1, wherein:
   the load of the apparatus includes a perceptible indicator which is enabled when the predetermined concentration of combustion products is present, said perceptible indicator requiring a relatively substantial amount of power for proper operation when enabled.

4. An energy powered sensing device, comprising:
   a source of power;
   means connected to said source of power for detecting the presence of a predetermined condition;

first power supplying means connected to said power source and said detecting means for providing power to said detecting means when the predetermined condition is not present, said first power supplying means including voltage multiplier means for increasing the voltage applied to said detecting means so that the voltage applied to said detecting means is substantially greater than the voltage output of said power source, said first power supply means further including first oscillator means for providing an output at a first predetermined frequency to said voltage multiplier means; and second power supplying means responsive to said detecting means for providing greater power to said detecting means than said first power supplying means when the predetermined condition is present.

5. The apparatus, as claimed in claim 4, wherein:
said second power supplying means includes second oscillator means which provides an output at a second predetermined frequency to said voltage multiplier means when the predetermined condition is present.

6. The apparatus, as claimed in claim 5, wherein:
said second predetermined frequency output is of a greater frequency than said first predetermined frequency output.

7. The apparatus, as claimed in claim 5, wherein:
said second predetermined frequency output and said voltage multiplier means provide a greater amount of current when the predetermined concentration of combustion products is present than does said first predetermined frequency output and said voltage multiplier means when the predetermined concentration of combustion products is not present.

8. The apparatus, as claimed in claim 6, wherein:
said first predetermined frequency output is responsive to said second predetermined frequency output so that said second predetermined frequency output neutralizes the action of said first predetermined frequency output when the predetermined concentration of combustion products is present so that said second predetermined frequency output and said voltage multiplier means control the supplying of power.

* * * * *